United States Patent
Wang et al.

(10) Patent No.: US 12,436,031 B2
(45) Date of Patent: Oct. 7, 2025

(54) INTEGRATED MULTI-PARAMETER SENSOR BASED ON OPTOELECTRONIC INTEGRATION AND FABRICATION METHOD THEREOF

(71) Applicant: ZHEJIANG LAB, Hangzhou (CN)

(72) Inventors: Shan Wang, Hangzhou (CN); Xiaoyu Wang, Hangzhou (CN); Qi Wang, Hangzhou (CN); Lei Zhang, Hangzhou (CN)

(73) Assignee: ZHEJIANG LAB, Hangzhou (CN)

( * ) Notice: Subject to any disclaimer, the term of this patent is extended or adjusted under 35 U.S.C. 154(b) by 0 days.

(21) Appl. No.: 19/221,599

(22) Filed: May 29, 2025

(65) Prior Publication Data

US 2025/0290798 A1 Sep. 18, 2025

Related U.S. Application Data

(63) Continuation of application No. PCT/CN2023/104859, filed on Jun. 30, 2023.

(30) Foreign Application Priority Data

May 9, 2023 (CN) .......................... 202310512850.9

(51) Int. Cl.
| | | |
|---|---|---|
| G01J 3/02 | (2006.01) | |
| G01J 3/28 | (2006.01) | |
| G01R 27/26 | (2006.01) | |

(52) U.S. Cl.
CPC .............. G01J 3/0218 (2013.01); G01J 3/28 (2013.01); G01R 27/2605 (2013.01)

(58) Field of Classification Search
CPC .......... G01J 3/0218; G01J 3/28; G01B 11/18; G02B 23/2476; G02B 23/2492;
(Continued)

(56) References Cited

U.S. PATENT DOCUMENTS 4,408,123 A * 10/1983 Sichling .................. G01D 5/30
250/226
2007/0145251 A1 6/2007 Ogura et al.
(Continued)

FOREIGN PATENT DOCUMENTS

| CN | 105671962 A | * | 6/2016 | ............ D06M 15/37 |
| CN | 105738012 A | * | 7/2016 | ............... G01L 1/16 |

(Continued)

OTHER PUBLICATIONS

Shan Wang, et al., Flexible Optoelectronic Multimodal Proximity/Pressure/Temperature Sensors with Low Signal Interference, Adv. Mater., 2023, pp. 2304701 (1 of 10).

*Primary Examiner* — Thomas A Hollweg
*Assistant Examiner* — Mary A El-Shammaa
(74) *Attorney, Agent, or Firm* — Bayramoglu Law Offices LLC

(57) ABSTRACT

The provided is an integrated multi-parameter (pressure, temperature, proximity) sensor based on optoelectronic integration and a fabrication method thereof. The sensor includes a flexible optical waveguide based on an optical mechanism and a flexible interdigitated electrode film based on an electrical mechanism and wound around the flexible optical waveguide, where the flexible optical waveguide is formed by inserting two optical fibers into a silicone tube, with the two optical fibers spaced apart from each other. The sensor achieves self-decoupled, crosstalk-free sensing of three parameters (pressure, temperature, proximity) through photoelectric-integrated multi-dimensional response signals. The sensor measures pressure via optical waveguide attenuation in the form of light intensity, measures temperature via the thermoresistive effect of the electrode in the form of resistance, and measures object proximity via the (Continued)

fringing electric field between the interdigitated electrodes in the form of capacitance.

12 Claims, 5 Drawing Sheets

(58) Field of Classification Search
CPC ............... G02B 23/26; G02B 23/2484; G02B 2006/12138; G01R 27/2605
See application file for complete search history.

(56) References Cited

U.S. PATENT DOCUMENTS

| | | | |
|---|---|---|---|
| 2012/0177319 A1* | 7/2012 | Alemohammad .. | C03C 25/1063 385/12 |
| 2021/0137418 A1* | 5/2021 | Dietz ................... | A61B 5/1126 |
| 2022/0034738 A1* | 2/2022 | Wu ....................... | G01L 5/162 |
| 2025/0102732 A1* | 3/2025 | Ohodnicki, Jr. ......... | G01J 1/44 |

FOREIGN PATENT DOCUMENTS

| | | | | | |
|---|---|---|---|---|---|
| CN | 108519168 | A | * | 9/2018 | ............. G01K 11/32 |
| CN | 108759704 | A | | 11/2018 | |
| CN | 208505254 | U | * | 2/2019 | |
| CN | 112326060 | A | * | 2/2021 | ............. G01K 11/32 |
| CN | 113324948 | A | * | 8/2021 | ......... G01K 11/3206 |
| CN | 114923606 | A | * | 8/2022 | ............... G01L 1/22 |
| CN | 114993381 | A | * | 9/2022 | ............... D01F 6/94 |
| CN | 217605155 | U | | 10/2022 | |
| CN | 115657199 | A | * | 1/2023 | |
| CN | 116295656 | A | | 6/2023 | |
| KR | 20160071568 | A | | 6/2016 | |
| WO | WO-2018047102 | A1 | * | 3/2018 | ............. A63G 31/16 |
| WO | WO-2023204766 | A1 | * | 10/2023 | ............. B25J 13/081 |

* cited by examiner

INTEGRATED MULTI-PARAMETER SENSOR BASED ON OPTOELECTRONIC INTEGRATION AND FABRICATION METHOD THEREOF

CROSS-REFERENCE TO THE RELATED APPLICATIONS

This application is a continuation application of International Application No. PCT/CN2023/104859, filed on Jun. 30, 2023, which is based upon and claims priority to Chinese Patent Application No. 202310512850.9, filed on May 9, 2023, the entire contents of which are incorporated herein by reference.

TECHNICAL FIELD

The present disclosure belongs to the technical field of sensors, and relates to a flexible multi-parameter sensor and a fabrication method thereof, in particular to an integrated multi-parameter (pressure, temperature, proximity) sensor based on optoelectronic integration and a fabrication method thereof.

BACKGROUND

Flexible sensors with multi-parameter sensing capabilities serve as critical components in humanoid electronic skins, demonstrating vast application potential across robotics, intelligent prosthetics, and human-machine interaction. In recent years, the research for multi-parameter sensors primarily adopts two approaches: integrating discrete sensing units into a unified sensory system, and engineering multi-functional materials capable of responding to various stimuli.

However, integrating sensor components with different functions increases system complexity, as the integrating process and signal processing are intricate, while the overall system compactness is compromised. For integrated multi-parameter sensors using multifunctional materials responsive to various stimuli, the cross-sensitivity among different stimuli creates signal crosstalk that impairs the discrimination capability of real-time monitoring, necessitating complex algorithms to decouple different stimulus signals. Therefore, achieving intuitive and interference-free acquisition of multiple stimulus signals without the need for complex system integration and decoupling algorithms remains a persistent challenge in multi-parameter sensors.

Overall, the prior art lacks an integrated multi-parameter (object pressure, temperature, proximity) sensor capable of simultaneously measuring the three parameters and self-decoding, eliminating signal crosstalk and algorithms for decoding, and achieving compact architecture.

SUMMARY

To address the deficiencies in the prior art, an objective of the present disclosure is to provide an integrated flexible multi-parameter sensor capable of simultaneously measuring three parameters, namely pressure, temperature, and proximity, and a fabrication method thereof. The present disclosure provides an integrated sensor free from cross-sensitivity and signal-crosstalk, solving problems of system complexity, excessive cost, signal crosstalk, and complex algorithm-dependent decoupling in the prior art. The present disclosure can simultaneously monitor pressure, temperature, and proximity, featuring no signal crosstalk, compact architecture, simple fabrication, and no need for complex system integration or decoupling algorithms, thereby exhibiting significant application potential.

The following technical solutions are adopted in the present disclosure.

I. An integrated multi-parameter sensor based on optoelectronic integration includes:

a flexible optical waveguide and a flexible interdigitated electrode film wrapped and wound around an outer surface of the flexible optical waveguide, where the flexible optical waveguide is formed by inserting two optical fibers into a silicone tube, with the two optical fibers spaced apart from each other; and the flexible interdigitated electrode film includes a flexible substrate and poly(3,4-ethylenedioxythiophene):poly(styrenesulfonate) (PEDOT:PSS) interdigitated electrodes printed on the substrate.

More specifically, the flexible optical waveguide is formed by inserting two optical fibers into two ends of a same silicone tube, with ends of the two optical fibers spaced apart from each other in the silicone tube.

The silicone tube has an inner diameter of 200 µm and an outer diameter of 2 mm.

The optical fibers are silica optical fibers or polymer optical fibers; and there is a distance of 1-5 mm between the ends of the two optical fibers.

The substrate of the flexible interdigitated electrode film includes but is not limited to a silk fibroin, polyurethane, or polydimethylsiloxane (PDMS) film, with a thickness of 20-200 µm.

The PEDOT:PSS in the flexible interdigitated electrode film is modified with ethylene glycol; and the ethylene glycol has a mass that is 5 wt % of a PEDOT:PSS solution.

A fabrication method for the PEDOT:PSS interdigitated electrode includes screen printing and laser etching.

The two optical fibers are coupled to an external optical spectrometer via an optical fiber adapter for signal acquisition; two electrodes of the flexible interdigitated electrode film are each electrically connected to an external capacitance acquisition circuit; and two terminals of one of the two electrodes are each electrically connected to an external resistance acquisition circuit.

The flexible interdigitated electrode film includes a flexible substrate and a PEDOT:PSS interdigitated electrode pattern printed on the substrate. The sensor can simultaneously monitor pressure, temperature, and proximity without signal crosstalk, and features compact architecture, simple fabrication, and no need for complex system integration or decoupling algorithms, showing broad application prospects.

In the technical solution of the present disclosure, pressure is measured by the flexible optical waveguide based on an optical mechanism, temperature is measured by the PEDOT:PSS temperature-sensitive material based on an electrical mechanism, and proximity of an object is measured by the interdigitated electrode.

In the sensor of the present disclosure, pressure is measured via optical waveguide attenuation in the form of light intensity, temperature is measured via the thermoresistive effect of the electrode in the form of resistance, and proximity of the object is measured via the fringing electric field between the interdigitated electrodes in the form of capacitance. Self-decoupled crosstalk-free sensing of the three parameters is achieved through cooperative interaction of optically and electrically independent signals.

II. A fabrication method for an integrated multi-parameter sensor based on optoelectronic integration includes the following steps:
(1) fabrication of the flexible optical waveguide:
cutting the silicone tube with a 2 cm length; inserting two flat-end optical fibers into openings at two ends of the silicone tube, respectively, with a 1-5 mm gap between inner ends of the two optical fibers; and connecting the two ends of the silicone tube to the optical fibers respectively via ultraviolet (UV) curing adhesive, thereby fixing the optical fibers;
(2) fabrication of the flexible interdigitated electrode film; and
(3) sensor fabrication:
connecting the flexible interdigitated electrode film to a lead, winding the flexible interdigitated electrode film around an outer surface of the silicone tube, and fixing the flexible interdigitated electrode film to the outer surface of the silicone tube via temperature-sensitive adhesive, thereby forming the integrated multi-parameter sensor.

The step (2) specifically includes:
adding 5 wt % ethylene glycol to the PEDOT:PSS solution, and performing stirring at room temperature for 30 min and stirring at 50° C. for 24 h, thereby forming a concentrated PEDOT:PSS solution; and
screen-printing the concentrated PEDOT:PSS solution onto the flexible substrate, and performing drying at 60° C. for 30 min and annealing at 100° C. for 10 min, thereby forming the flexible interdigitated electrode film.

The flexible optical waveguide deforms under pressure, resulting in increased light transmission loss, with the light intensity change correlating to pressure magnitude, thereby realizing pressure measurement.

On the flexible interdigitated electrode film, two terminals of one electrode are respectively connected to two leads, specifically a first lead and a second lead, while one terminal of the other electrode is connected to a third lead.

The PEDOT:PSS resistance between the first lead and the second lead of the flexible interdigitated electrode leads changes with temperature, thereby realizing temperature measurement.

The fringing electric field between the first lead and the third lead of the flexible interdigitated electrode leads changes when an object approaches, with the capacitance change correlating to the distance of the object approaching, thereby realizing proximity measurement.

Conventional dual-parameter (pressure and temperature) sensors rely on electrical sensing mechanisms such as piezoresistive, piezocapacitive, or piezoelectric effects, where pressure application causes changes in sensor resistance, capacitance, or voltage for pressure detection. However, besides pressure, temperature also induces changes in sensor parameters like resistance, causing signal crosstalk between pressure and temperature, making sensors incapable of self-decoupling pressure and temperature for accurate discrimination. Additionally, proximity sensors typically based on capacitive effects also experience signal crosstalk since both pressure and object proximity cause capacitance changes. Since sensors based on electrical principles output similar and interdependent electrical signals (capacitance, voltage, current, or resistance) for the three parameters: pressure, temperature, and proximity, single electrical signals struggle to decouple the three parameters: pressure, temperature, and proximity.

The present disclosure employs two fundamentally different sensing mechanisms (optical and electrical) to monitor pressure, temperature, and proximity through the two dimensions of light and electricity as mutually independent signals. The presence/absence of light intensity changes determines object contact/non-contact (proximity), followed by pressure measurement via light intensity changes, proximity distance measurement via capacitance changes, and temperature measurement via resistance changes. Specifically, the light intensity signal for pressure measurement is independent of temperature and object proximity. The PEDOT:PSS material for temperature measurement exhibits extremely low strain sensitivity, making its resistance unaffected by pressure and proximity. The capacitance signal from the fringing electric field of the interdigitated electrodes for proximity measurement remains unaffected by temperature. Thus, the integrated multi-parameter sensor based on optoelectronic integration of the present disclosure achieves simultaneous pressure-temperature-proximity monitoring without signal crosstalk.

III. A measurement method using the integrated multi-parameter sensor based on optoelectronic integration includes the following step.

The integrated multi-parameter sensor of the present disclosure enables simultaneous tri-parameter (pressure, temperature, and proximity) detection without mutual interference, requiring no decoupling algorithms to separate signals from different parameters.

Specifically:

In terms of pressure, two ends of the optical fiber of the flexible optical waveguide are connected to a light source and an optical spectrometer, respectively. The optical spectrometer monitors the output light intensity in real time. The optical waveguide deforms under pressure to increase light transmission loss, with the sensitivity calculated via the change rate between output and input light intensities.

In terms of temperature, the conductive network and charge transport within the PEDOT:PSS material vary with temperature to cause resistance changes. The temperature result is obtained by measuring the relative resistance change rate of PEDOT:PSS in one electrode of the flexible interdigitated electrode film.

In terms of proximity, the fringing electric field distribution between two interdigitated electrodes in the flexible interdigitated electrode film changes with object proximity to cause capacitance changes. The proximity result is obtained through the relative capacitance change rate.

In the present disclosure, the capacitance of the selected flexible interdigitated electrode is defined by:

$$C = (2\varepsilon_r \varepsilon_0 (N-1) L) \ln\left[(1 + w/g) + \left((1 + w/g)^2 - 1\right)^{1/2}\right]/\pi$$

where, $\varepsilon_r$ denotes a relative permittivity of the substrate; $\varepsilon_0$ denotes a vacuum permittivity; fingers feature a gap of 2 g, a length of L, and a width of w; and there are N fingers. This formula confirms that the capacitance depends solely on the permittivity of the substrate and the structure parameter of the interdigitated electrode. Therefore, the present disclosure selects the flexible substrate with a temperature-invariant permittivity within operational ranges, ensuring temperature immunity in proximity measurement.

Under deformation, the material of the flexible interdigitated electrode film selected in the present disclosure exhibits low strain sensitivity and the dense internal conductive network renders the film minimally affected by pressure. This ensures that deformation under pressure does not influence temperature measurement.

Meanwhile, the present disclosure uses the presence/absence of light intensity changes to determine whether an object is in contact or non-contact (proximity). If contact occurs, the pressure result is obtained via light intensity changes while the temperature result is obtained via resistance changes. If no contact occurs, the proximity result is obtained via capacitance changes while the temperature result is still obtained via resistance changes.

Thus, the present disclosure achieves detection of the three parameters: proximity, pressure, and temperature, without mutual interference.

Compared with the prior art, the present disclosure has the following beneficial effects:

(1) Compared to sensing systems integrating multiple sensors, the integrated multi-parameter sensor of the present disclosure demonstrates advantages including compact size, simple structure, simple fabrication process, and low cost. Furthermore, the compact architecture of the integrated sensor enables simultaneous pressure and temperature detection at the same location, whereas multi-sensor integrated systems often measure pressure and temperature at different positions.

(2) The integrated multi-parameter sensor based on optoelectronic integration of the present disclosure, compared to conventional single-principle electrical or optical sensors, provides multi-dimensional sensing signals, thereby eliminating parameter crosstalk and obviating the need for decoupling. In contrast, conventional sensors based on single sensing principles require complex algorithms and hardware/software for multi-parameter decoupling, or even fail to achieve decoupling.

In summary, the present disclosure obtains an integrated multi-parameter sensor with compact architecture, simple fabrication, no need for complex system integration or decoupling algorithms, and simultaneous pressure-temperature-proximity monitoring without signal crosstalk. It holds significant importance for advancing fields such as Metaverse virtual-real interactions, human-machine interaction, and intelligent robotics.

BRIEF DESCRIPTION OF THE DRAWINGS

FIG. 1A is an overall structural diagram of the device; and FIG. 1B is a cross-sectional schematic diagram of the device;

FIG. 2A shows planar electrodes; FIG. 2B shows interdigitated electrodes with 2 finger pairs; FIG. 2C shows interdigitated electrodes with 3 finger pairs; and FIG. 2D shows interdigitated electrodes with 4 finger pairs;

FIG. 4A shows spectra of the multi-parameter sensor under different pressures; and FIG. 4B shows a light intensity change and sensitivity of the sensor under different applied pressures;

FIG. 5A shows a temperature sensitivity of the multi-parameter sensor; and FIG. 5B shows a resistance change rate of the multi-parameter sensor at different temperatures;

FIG. 7A shows spectra of the sensor at different temperatures; and FIG. 7B shows pressure responses of the sensor at different temperatures; FIG. 8A shows a temperature response of the sensor under different pressures; and FIG. 8B shows changes in light intensity and resistance of the sensor when pressure and temperature are applied to the sensor.

DETAILED DESCRIPTION OF THE EMBODIMENTS

Figure 1A:
FIGS. 1A and 1B show a structural schematic diagram of a flexible pressure sensor in Embodiment 1, where
Figure 1B:
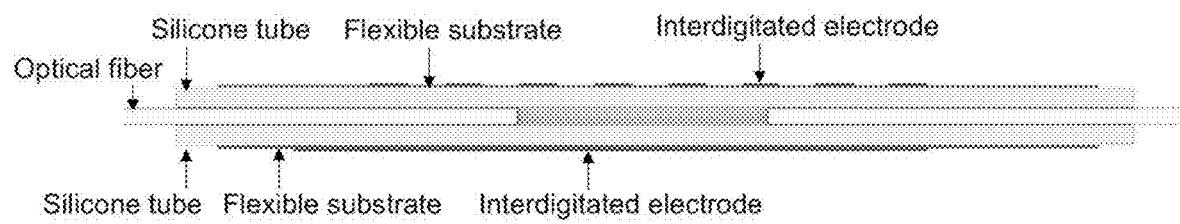
Figure 2A:
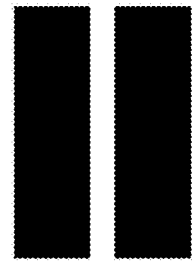
FIGS. 2A-2D display different electrode structures in Embodiment 1 and Comparative Examples 1 to 3, where
Figure 2B:
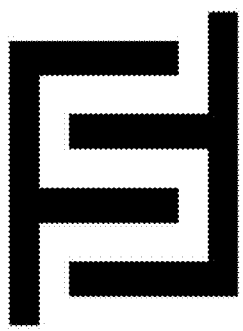
Figure 2C:
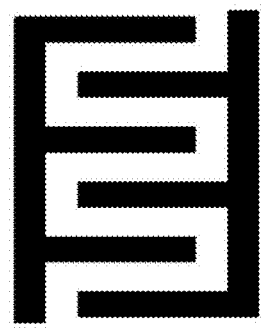
Figure 2D:
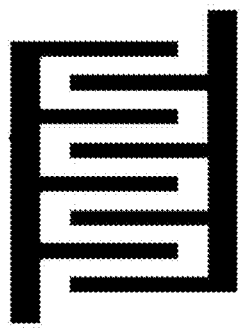

The present disclosure is described in further detail below with reference to specific embodiments and drawings.

The embodiments of the present disclosure are described as follows.

Embodiment 1: Integrated Multi-Parameter Sensor Based on Optoelectronic Integration Using 3-Pair Interdigitated Electrodes (1) Fabrication of Flexible Optical Waveguide A 2 cm long silicone tube is cut. Two flat-end optical fibers are inserted into openings at two ends of the silicone tube, respectively, with a 1-5 mm gap between inner ends of the two optical fibers. The two ends of the silicone tube are connected to the optical fibers respectively via ultraviolet (UV) curing adhesive, thereby fixing the optical fibers.

(2) Fabrication of Flexible Interdigitated Electrode Film 5 wt % ethylene glycol is added to a PEDOT:PSS solution, followed by stirring at room temperature for 30 min and stirring at 50° C. for 24 h, thereby forming a concentrated PEDOT:PSS solution.

The concentrated PEDOT:PSS solution is screen-printed onto a plasma-treated (10 min) flexible substrate using a screen printing plate with 3 pairs of fingers, followed by drying at 60° C. for 30 min and annealing at 100° C. for 10 min to obtain a flexible electrode film with 3 pairs of fingers.

(3) Sensor Fabrication

The flexible interdigitated electrode film is connected to a lead, wound around an outer surface of the silicone tube, and fixed to the outer surface of the silicone tube via temperature-sensitive adhesive, thereby forming the integrated multi-parameter sensor.

Comparative Example 1: Integrated Multi-Parameter Sensor Based on Optoelectronic Integration Using Planar Electrodes (1) Fabrication of Flexible Optical Waveguide A 2 cm long silicone tube is cut. Two flat-end optical fibers are inserted into openings at two ends of the silicone tube, respectively, with a 1-5 mm gap between inner ends of the two optical fibers. The two ends of the silicone tube are connected to the optical fibers respectively via ultraviolet (UV) curing adhesive, thereby fixing the optical fibers.

(2) Fabrication of Flexible Interdigitated Electrode Film 5 wt % ethylene glycol is added to a PEDOT:PSS solution, followed by stirring at room temperature for 30 min and stirring at 50° C. for 24 h, thereby forming a concentrated PEDOT:PSS solution.

The concentrated PEDOT:PSS solution is screen-printed onto a plasma-treated (10 min) flexible substrate using a screen printing plate with planar electrodes, followed by drying at 60° C. for 30 min and annealing at 100° C. for 10 min to obtain a flexible electrode film with planar electrodes.

(3) Sensor Fabrication

The flexible interdigitated electrode film is connected to a lead, wound around an outer surface of the silicone tube, and fixed to the outer surface of the silicone tube via temperature-sensitive adhesive, thereby forming the integrated multi-parameter sensor.

Comparative Example 2: Integrated Multi-Parameter Sensor Based on Optoelectronic Integration Using 2-Pair Interdigitated Electrodes (1) Fabrication of Flexible Optical Waveguide A 2 cm long silicone tube is cut. Two flat-end optical fibers are inserted into openings at two ends of the silicone tube, respectively, with a 1-5 mm gap between inner ends of the two optical fibers. The two ends of the silicone tube are connected to the optical fibers respectively via ultraviolet (UV) curing adhesive, thereby fixing the optical fibers.

(2) Fabrication of Flexible Interdigitated Electrode Film 5 wt % ethylene glycol is added to a PEDOT:PSS solution, followed by stirring at room temperature for 30 min and stirring at 50° C. for 24 h, thereby forming a concentrated PEDOT:PSS solution.

The concentrated PEDOT:PSS solution is screen-printed onto a plasma-treated (10 min) flexible substrate using a screen printing plate with 2 pairs of fingers, followed by drying at 60° C. for 30 min and annealing at 100° C. for 10 min to obtain a flexible electrode film with 2 pairs of fingers.

(3) Sensor Fabrication

The flexible interdigitated electrode film is connected to a lead, wound around an outer surface of the silicone tube, and fixed to the outer surface of the silicone tube via temperature-sensitive adhesive, thereby forming the integrated multi-parameter sensor.

Comparative Example 3: Integrated Multi-Parameter Sensor Based on Optoelectronic Integration Using 4-Pair Interdigitated Electrodes (1) Fabrication of Flexible Optical Waveguide A 2 cm long silicone tube is cut. Two flat-end optical fibers are inserted into openings at two ends of the silicone tube, respectively, with a 1-5 mm gap between inner ends of the two optical fibers. The two ends of the silicone tube are connected to the optical fibers respectively via ultraviolet (UV) curing adhesive, thereby fixing the optical fibers.

(2) Fabrication of Flexible Interdigitated Electrode Film 5 wt % ethylene glycol is added to a PEDOT:PSS solution, followed by stirring at room temperature for 30 min and stirring at 50° C. for 24 h, thereby forming a concentrated PEDOT:PSS solution.

The concentrated PEDOT:PSS solution is screen-printed onto a plasma-treated (10 min) flexible substrate using a screen printing plate with 4 pairs of fingers, followed by drying at 60° C. for 30 min and annealing at 100° C. for 10 min to obtain a flexible electrode film with 4 pairs of fingers.

(3) Sensor Fabrication

The flexible interdigitated electrode film is connected to a lead, wound around an outer surface of the silicone tube, and fixed to the outer surface of the silicone tube via temperature-sensitive adhesive, thereby forming the integrated multi-parameter sensor.

Figure 3:
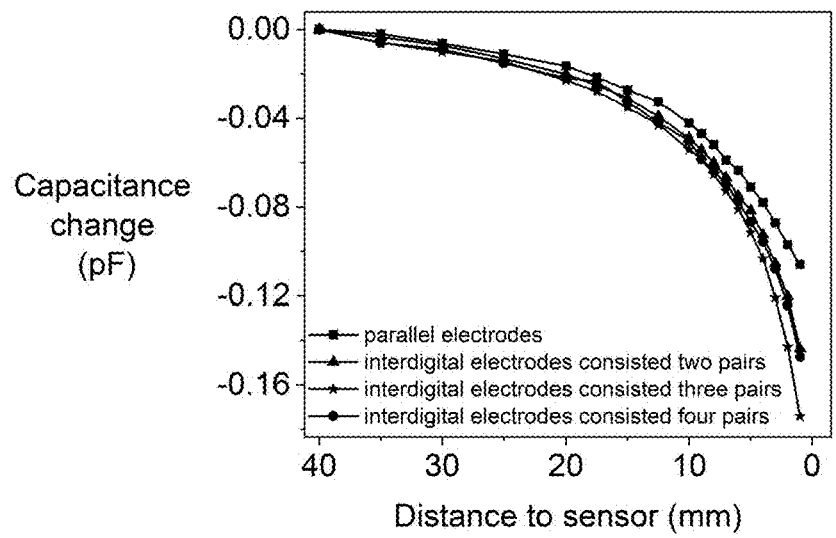
FIG. 3 shows proximity response performance of sensors with 4 different electrode structures.

In the present disclosure, test results of the embodiment and Comparative Examples 1 to 3 are shown in FIG. 3. It can be seen that the optimized interdigital structure design demonstrates high proximity response sensitivity in the multi-parameter sensor of the present disclosure.

Figure 4A:
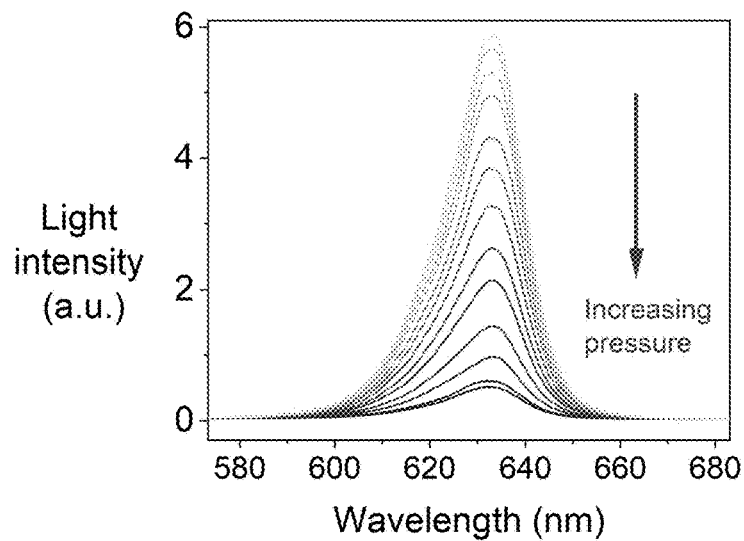
FIGS. 4A and 4B show a pressure response of a multi-parameter sensor, where
Figure 4B:
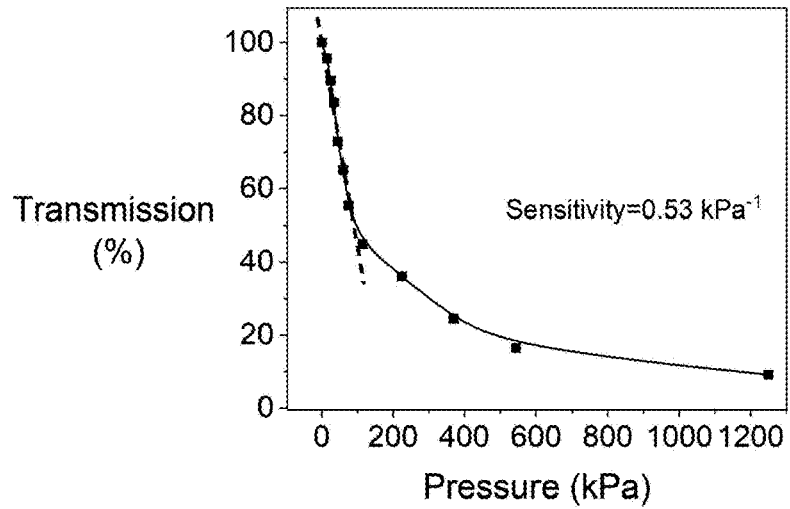

FIGS. 4A and 4B show the pressure response of the multi-parameter sensor in the present disclosure. It can be seen that the light intensity of the sensor decreases with increasing pressure, achieving a sensitivity of 0.53 kPa$^{-1}$.

Figure 5A:
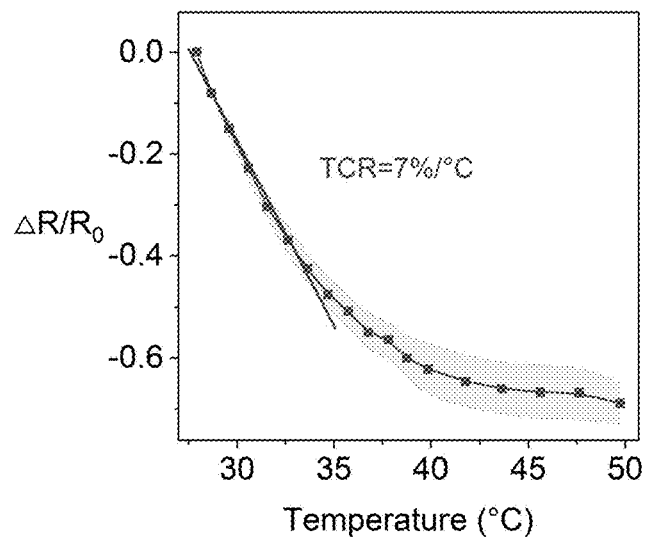
FIGS. 5A and 5B show a temperature response of the multi-parameter sensor, where
Figure 5B:
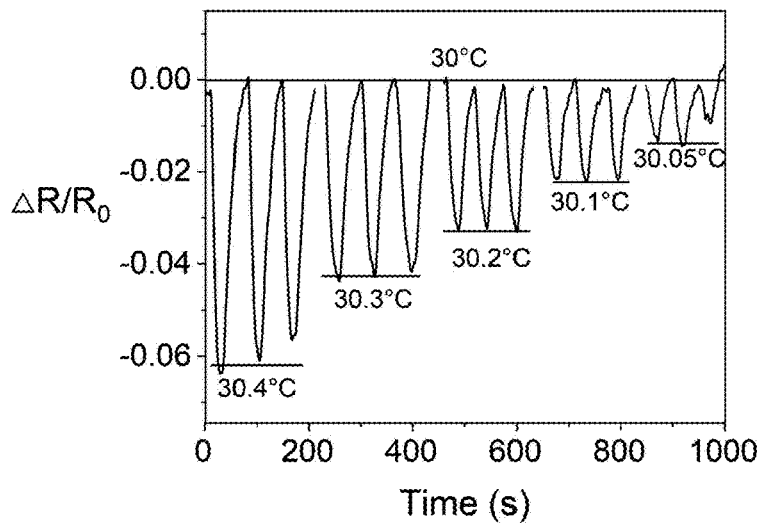

FIGS. 5A and 5B show the temperature response of the multi-parameter sensor in the present disclosure. It can be seen that the resistance of the sensor decreases with increasing temperature, achieving a sensitivity of 7%/° C. to a temperature change of 0.05° C.

Figure 6:
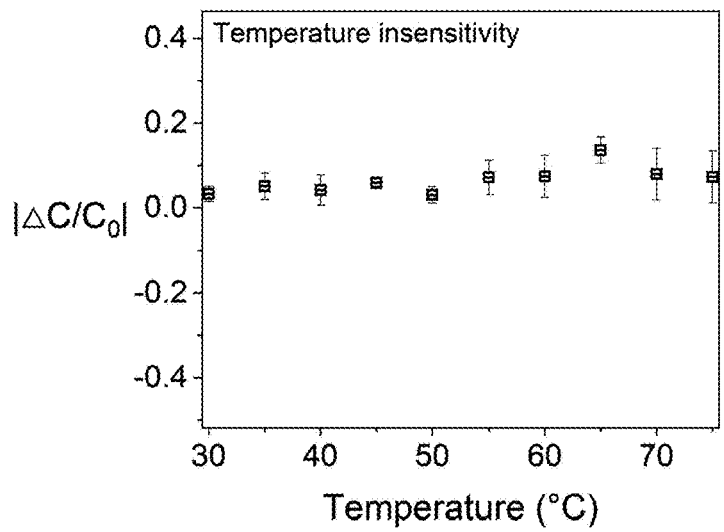
FIG. 6 shows a temperature-dependent capacitance of the multi-parameter sensor.

FIG. 6 shows a temperature-dependent capacitance change of the multi-parameter sensor in the present disclosure. It can be seen that the capacitance of the sensor exhibits negligible changes over a temperature range from 30° C. to 75° C., indicating minimal cross-sensitivity between temperature and capacitance responses.

Figure 7A:
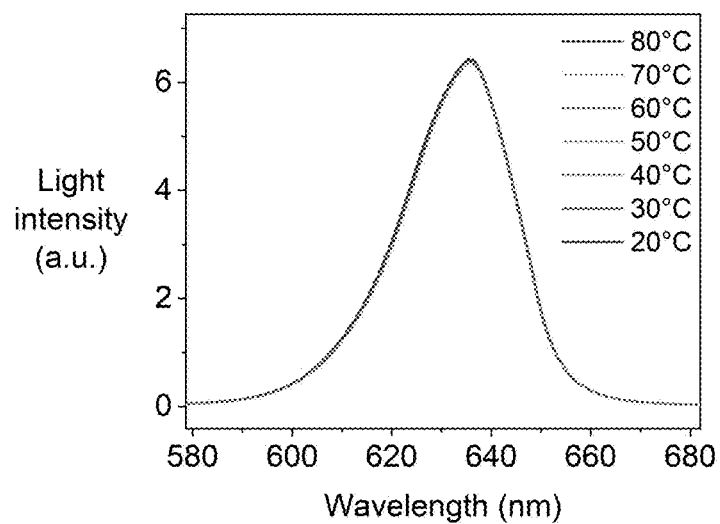
FIGS. 7A and 7B show a temperature-dependent pressure response of the multi-parameter sensor, where
Figure 7B:
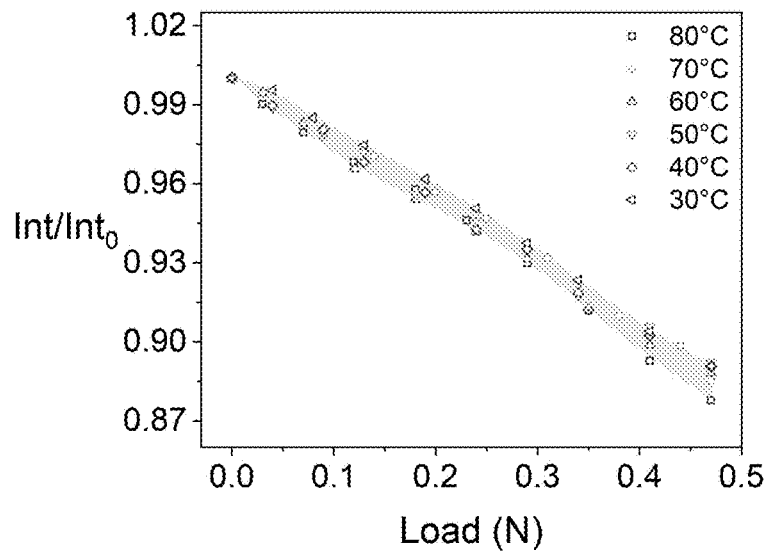

FIGS. 7A and 7B show the pressure-dependent spectral response of the sensor at different temperatures. It can be seen that the light intensity and pressure response of the sensor exhibit negligible temperature dependence, proving no cross-sensitivity between temperature and pressure responses.

Figure 8A:
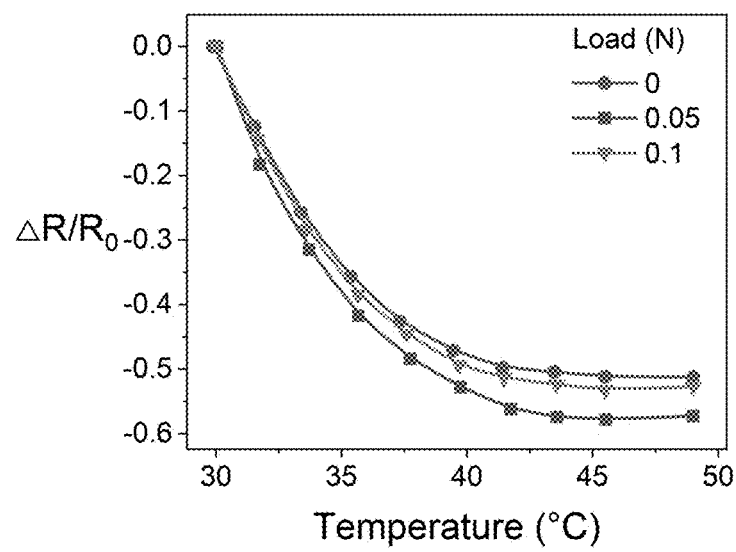
FIGS. 8A and 8B show a pressure-dependent temperature response of the multi-parameter sensor, where
Figure 8B:
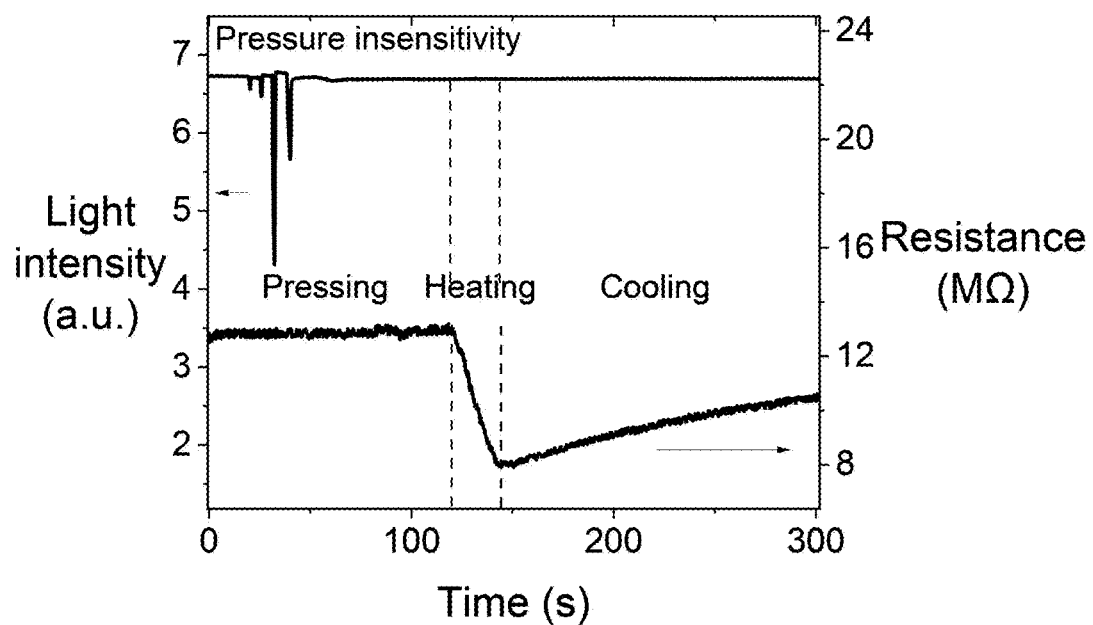

FIG. 8A shows the temperature-dependent resistance of the sensor under different pressures. It can be seen that the temperature response shows negligible effects from pressure changes. FIG. 8B records simultaneous light intensity and resistance signals of the sensor under pressure and temperature changes. It can be seen that the pressure induces only a light intensity change, while the temperature change induces only a resistance change, achieving pressure-temperature decoupling.

This embodiment demonstrates that the present disclosure achieves simultaneous high sensitivity to proximity, pressure, and temperature, with no signal crosstalk between the three parameters, enabling multi-parameter (proximity, pressure, and temperature) differentiation without requiring complex decoupling processes.

What is claimed is:

1. An integrated multi-parameter sensor based on optoelectronic integration, comprising:
    a flexible optical waveguide and a flexible interdigitated electrode film wound around an outer surface of the flexible optical waveguide, wherein the flexible optical waveguide is formed by inserting two optical fibers into a silicone tube, with the two optical fibers spaced apart from each other at a predetermined distance; and the flexible interdigitated electrode film comprises a flexible substrate and poly(3,4-ethylenedioxythiophene):poly(styrenesulfonate) (PEDOT:PSS) interdigitated electrodes printed on the flexible substrate;
    the flexible optical waveguide is formed by inserting the two optical fibers into two ends of a same silicone tube, with ends of the two optical fibers spaced apart from each other at the predetermined distance in the silicone tube;
    the two optical fibers are coupled to an external optical spectrometer via an optical fiber adapter for light intensity change signal acquisition; two electrodes of the flexible interdigitated electrode film are each electrically connected to an external capacitance acquisition circuit by flexible interdigitated electrode leads; and two terminals of one of the two electrodes are each electrically connected to an external resistance acquisition circuit by flexible interdigitated electrode leads; and the capacitance acquisition circuit acquires a capacitance signal of a fringing electric field between two flexible interdigitated electrode leads that connect the electrodes to the capacitance acquisition circuit.

2. The integrated multi-parameter sensor based on the optoelectronic integration according to claim 1, wherein the flexible substrate of the flexible interdigitated electrode film comprises at least one of a silk fibroin, polyurethane, and polydimethylsiloxane (PDMS) film, with a thickness of 20-200 μm.

3. The integrated multi-parameter sensor based on the optoelectronic integration according to claim 2, wherein the PEDOT:PSS in the flexible interdigitated electrode film is modified with ethylene glycol; and the ethylene glycol has a mass that is 5 wt % of a PEDOT:PSS solution.

4. A fabrication method for the integrated multi-parameter sensor according to claim 1, comprising the following steps:
1) fabrication of the flexible optical waveguide:
cutting the silicone tube; inserting two flat-end optical fibers into openings at two ends of the silicone tube, respectively, with a 1-5 mm gap between inner ends of the two optical fibers; and connecting the two ends of the silicone tube to the two optical fibers respectively via ultraviolet (UV) curing adhesive;
2) fabrication of the flexible interdigitated electrode film; and
3) sensor fabrication:
connecting the flexible interdigitated electrode film to a lead, winding the flexible interdigitated electrode film around an outer surface of the silicone tube, and fixing the flexible interdigitated electrode film to the outer surface of the silicone tube via temperature-sensitive adhesive, wherein the integrated multi-parameter sensor is formed.

5. The fabrication method according to claim 4, wherein the step 2) comprises:
adding 5 wt % ethylene glycol to the PEDOT:PSS solution, and performing stirring at room temperature for 30 min and stirring at 50° C. for 24 h, wherein a concentrated PEDOT:PSS solution is formed; and
screen-printing the concentrated PEDOT:PSS solution onto the flexible substrate, and performing drying at 60° C. for 30 min and annealing at 100° C. for 10 min, wherein the flexible interdigitated electrode film is formed.

6. The fabrication method according to claim 5, wherein on the flexible interdigitated electrode film, two terminals of a first electrode are respectively connected to two leads, comprising a first lead and a second lead, while one terminal of a second electrode is connected to a third lead;
the first lead and the second lead are electrically connected to the external resistance acquisition circuit, and the first lead and the third lead are electrically connected to the external capacitance acquisition circuit.

7. The fabrication method according to claim 4, wherein in the integrated multi-parameter sensor, the flexible substrate of the flexible interdigitated electrode film comprises at least one of a silk fibroin, polyurethane, and polydimethylsiloxane (PDMS) film, with a thickness of 20-200 μm.

8. The fabrication method according to claim 7, wherein in the integrated multi-parameter sensor, the PEDOT:PSS in the flexible interdigitated electrode film is modified with ethylene glycol; and the ethylene glycol has a mass that is 5 wt % of a PEDOT:PSS solution.

9. The fabrication method according to claim 7, wherein the step 2) comprises:
adding 5 wt % ethylene glycol to the PEDOT:PSS solution, and performing stirring at room temperature for 30 min and stirring at 50° C. for 24 h, wherein a concentrated PEDOT:PSS solution is formed; and
screen-printing the concentrated PEDOT:PSS solution onto the flexible substrate, and performing drying at 60° C. for 30 min and annealing at 100° C. for 10 min, wherein the flexible interdigitated electrode film is formed.

10. The fabrication method according to claim 8, wherein the step 2) comprises:
adding 5 wt % ethylene glycol to the PEDOT:PSS solution, and performing stirring at room temperature for 30 min and stirring at 50° C. for 24 h, wherein a concentrated PEDOT:PSS solution is formed; and
screen-printing the concentrated PEDOT:PSS solution onto the flexible substrate, and performing drying at 60° C. for 30 min and annealing at 100° C. for 10 min, wherein the flexible interdigitated electrode film is formed.

11. The fabrication method according to claim 9, wherein
on the flexible interdigitated electrode film, two terminals of a first electrode are respectively connected to two leads, comprising a first lead and a second lead, while one terminal of a second electrode is connected to a third lead;
the first lead and the second lead are electrically connected to the external resistance acquisition circuit, and the first lead and the third lead are electrically connected to the external capacitance acquisition circuit.

12. The fabrication method according to claim 10, wherein
on the flexible interdigitated electrode film, two terminals of a first electrode are respectively connected to two leads, comprising a first lead and a second lead, while one terminal of a second electrode is connected to a third lead;
the first lead and the second lead are electrically connected to the external resistance acquisition circuit, and the first lead and the third lead are electrically connected to the external capacitance acquisition circuit.

* * * * *